(12) United States Patent
Snider

(10) Patent No.: US 6,913,011 B1
(45) Date of Patent: Jul. 5, 2005

(54) TAPERED GRILL, SMOKER AND FIREPLACE DEVICE

(76) Inventor: Ronald B. Snider, 358 Lakeview Blvd., New Braunfels, TX (US) 78130

( * ) Notice: Subject to any disclaimer, the term of this patent is extended or adjusted under 35 U.S.C. 154(b) by 0 days.

(21) Appl. No.: 10/936,288

(22) Filed: Sep. 8, 2004

(51) Int. Cl.$^7$ .............................................. A47J 37/00
(52) U.S. Cl. ........................ 126/9 R; 126/25 R; 99/450
(58) Field of Search ............................ 126/25 R, 41 R, 126/51, 304 R, 519; 99/450, 447

(56) References Cited

U.S. PATENT DOCUMENTS

| | | | | |
|---|---|---|---|---|
| 1,463,935 A | * | 8/1923 | Bond ............................ | 126/14 |
| 3,809,051 A | * | 5/1974 | Giroux ......................... | 126/9 R |
| 3,974,760 A | * | 8/1976 | Ellis ............................. | 99/482 |
| 4,259,941 A | * | 4/1981 | Gerdes ......................... | 126/515 |
| 4,721,037 A | | 1/1988 | Blosnich | |
| 4,962,696 A | | 10/1990 | Gillis | |
| 5,163,359 A | | 11/1992 | McLane, Sr. | |
| 5,218,950 A | * | 6/1993 | Hait ............................. | 126/9 R |
| 5,279,277 A | * | 1/1994 | Barker ......................... | 126/41 R |
| 5,325,841 A | | 7/1994 | Hooper, Sr. | |
| 5,515,774 A | * | 5/1996 | Swisher et al. ............... | 99/340 |
| 5,711,209 A | * | 1/1998 | Guines ......................... | 99/339 |
| 5,836,298 A | | 11/1998 | Grady | |
| 6,182,560 B1 | * | 2/2001 | Andress ....................... | 99/400 |
| 6,205,996 B1 | * | 3/2001 | Ryan ............................ | 126/41 R |
| 6,209,533 B1 | | 4/2001 | Ganard | |
| 6,520,174 B1 | * | 2/2003 | Scigliuolo .................... | 126/25 R |
| 6,595,197 B1 | | 7/2003 | Ganard | |
| 6,708,604 B1 | | 3/2004 | Deichler, Jr. | |
| 6,748,939 B1 | | 6/2004 | Gober | |
| 6,755,188 B2 | | 6/2004 | Skidmore et al. | |

* cited by examiner

*Primary Examiner*—Stephen Gravini
(74) *Attorney, Agent, or Firm*—Charles W. Hanor, P.C.

(57) ABSTRACT

A combination grill, smoker and fireplace device having a tapered configuration, where heat, smoke and/or gas upwardly passes through a tapered interior chamber and exits through a vent system. The tapered chamber collectively includes a heat source, a grate, one or more racks and a rack support means; and is configured to effectively reflect the heat smoke and/or gas at an optimal angle inhibiting the occurrence of radial bounce, reducing thermal bottlenecking, alleviating pressure buildup and increasing thermal efficiency. In an embodiment, the device incorporates a storage compartment to house equipment, accessories and/or materials therein. Alternatively, the device includes screen doors positioned behind the second set of doors being attached to an enclosure. The enclosure may act as a fireplace, grill or smoker and the chamber acts as an elongated chimney. In a further embodiment, the base of the device is closely located to the ash pan and acts as a deck to prohibit heat from being transferred to a flooring or ground surface.

15 Claims, 16 Drawing Sheets

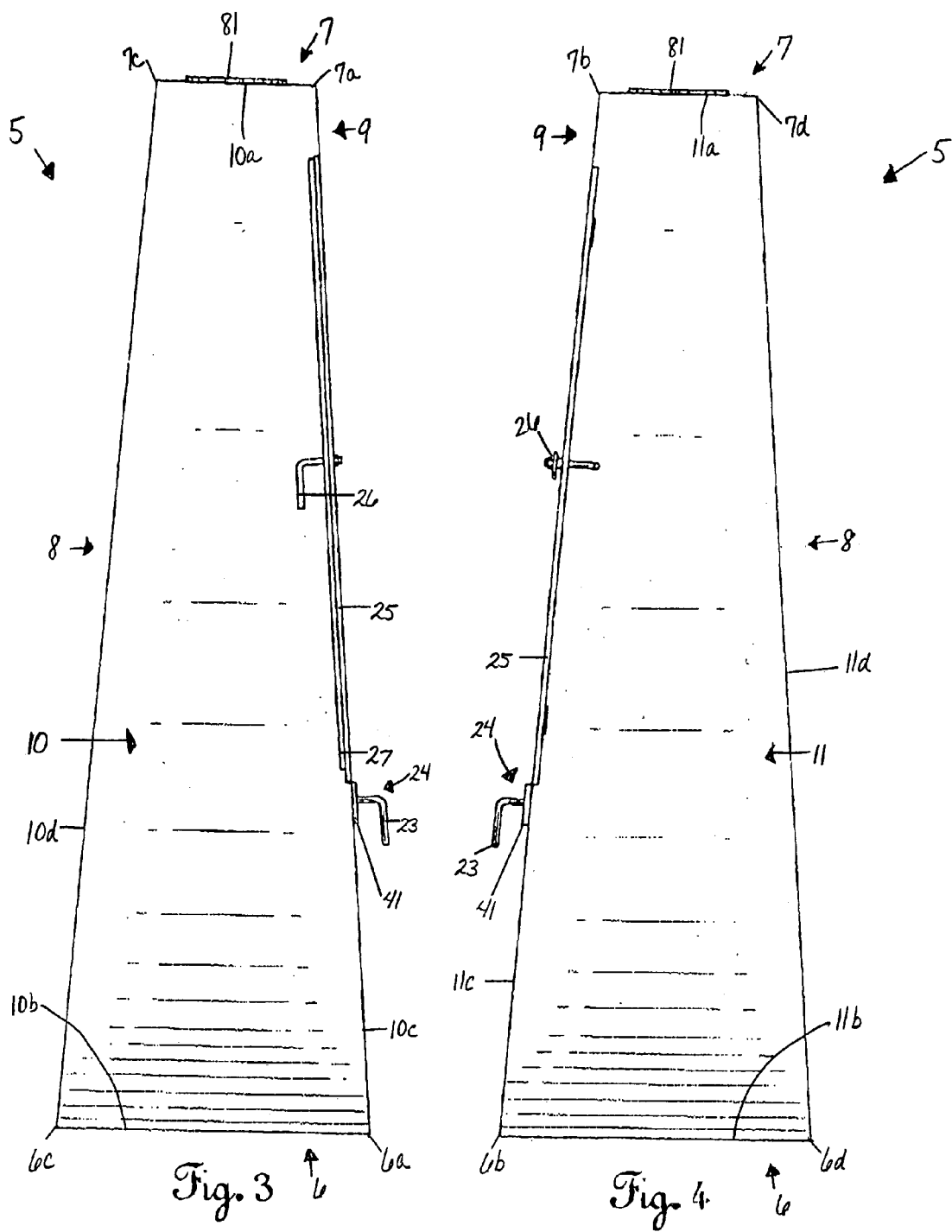

TAPERED GRILL, SMOKER AND FIREPLACE DEVICE

CROSS-REFERENCE TO RELATED APPLICATIONS

N/A

STATEMENTS REGARDING FEDERALLY SPONSORED RESEARCH OR DEVELOPMENT

N/A

REFERENCE TO A MICROFICHE APPENDIX

N/A

BACKGROUND OF THE INVENTION

1. Field of the Invention

This invention relates to the field of cooking and fireplace devices; more particularly, to a combination grill, smoker and fireplace device having a tapered configuration.

2. Description of the Related Art

Outdoor fireplaces, grills and smokers have greatly evolved over the past decades. Barbeque grills were commonly used for food preparation outside many homes throughout the United States. For users who desired to have their food smoked instead of just grilled, a device called a smoker was introduced into the food preparation industry. The smoker had an enclosed chamber with a heat source, which could be charcoal or electric, and typically wood chips positioned at the bottom and trays to hold the food. Many inventions, such as U.S. Pat. Nos. 3,786,741; 4,721,037; and 6,595,197, began to combine the grill and smoker devices together, thereby saving a potential customer the expense of having to buy and maintain two separate items.

Other combination apparatuses such as smoker and oven devices or grills with incorporated fireplaces then started to emerge. U.S. Pat. No. 6,708,604 (hereinafter called "the '604 patent") issued to Deichler, Jr. on Mar. 23, 2004 described a collapsible smoker and oven device. The '604 patent described a device having a folding center section assembly and support plates pivotally mounted to fold out quickly, with a cover on top. Then, U.S. Pat. No. 6,755,188 (hereinafter called "the '188 patent") issued to Skidmore et al. on Jun. 29, 2004 described a convertible grill and fireplace. The '188 patent discloses a grill and fireplace having a single firebox and lid, both of which may be used in both a grill configuration and a fireplace configuration. The fireplace configuration has a detachable and foldable screen assembly positioned between the firebox and the lid. The '188 patent also described its apparatus to include retractable legs so that the firebox may be lowered or raised. However, neither the '604 patent nor the '188 patent provided for a grill, smoker and outdoor fireplace.

U.S. Pat. No. 6,748,939 (hereinafter called the '939 patent) issued to Gober on Jun. 15, 2004 described a grill, smoker and outdoor fireplace having a support frame with legs for supporting a chamber member and a middle member forming a heating cavity. The middle member is formed of four plate with edges of adjacent plates welded together to form a square opening extending between an upper end and a lower end of the member. The chamber member has walls that taper inward from its upper end to an ash removal opening and is designed to dump ashes down a chute so the ashes can be quickly removed without disassembling the grill. However, heat and smoke generated inside the chamber of the '939 patent rises to the top creating a convection oven effect causing heat crowning at the top of the chamber.

In view of the above described deficiencies associated with the use of conventional methods and systems for raising, leveling, supporting and repairing existing damaged foundations, the present invention has been developed to alleviate these drawbacks and provide further benefits to a user. These enhancements and benefits are described in greater detail herein below with respect to several embodiments of the present invention.

BRIEF SUMMARY OF THE INVENTION

The present invention in its several disclosed embodiments alleviates the drawbacks described above with respect to fireplaces and outdoor cooking devices such as grills and smokers and incorporates several additional beneficial features. The present invention described herein is a combination grill, smoker and fireplace device having multiple peripheral surfaces fastened to one another to form a hollow chamber therein. One of the peripheral surfaces incorporates a door or first set of doors allowing a user to access the chamber. A protruding edge extending from the door or set of doors prevents natural elements such as rain, animals or insects to access the chamber. Also, the protruding edge can act as a seal to protect items, such as food, stored therein.

Walls of the chamber may incorporate a rack support means such as sets of lateral shelf members perpendicularly extending from at least two opposing walls or heat resistant guide rails attached to the walls to support one or more racks. A grate is positioned between the racks and a heat source and is capable of supporting a variety burnable materials thereon. The heat source may range from electrical means, gas, burnable materials and/or other heating sources allowing the user to utilize the device irrespective of the user's present heating options.

Heat, smoke and/or gas will pass through the tapered chamber in an upward manner leading into and through the vent system ultimately exiting the device. An advantage of the tapered chamber configuration is the heat, smoke and/or gas are reflected at an optimal angle inhibiting the occurrence of radial bounce, reducing thermal bottlenecking, alleviating pressure buildup and increasing thermal efficiency. The vent system includes a damper to moisten and diminish sparks and a spark arrestor screen to capture stray sparks and prevent them from exiting the device.

An ash pan is positioned below the chamber to collect fallen ashes and other burn off directly from the heat source and/or the burnable material. The ash pan discretely hides the ashes to provide for a more sanitary appearance. A storage compartment is located underneath the ash pan allowing for cooking equipment and/or fireplace accessories and materials to be stored and increasing the device's overall aesthetics to users and potential customers.

In an alternative embodiment, the device may incorporate a second set of doors fastened to an enclosure positioned below the first set of doors near the base of the device. The enclosure may itself function like the abovementioned chamber acting as a grill, smoker or a fireplace, whereas the chamber acts as an elongated chimney. The enclosure may also include an ash pan to catch ashes. Screen doors are positioned behind the second set of doors and are independently fastened to the device. Protruding edge members may also extend from the second set of doors acting as protection for stored items and acting as a seal to prevent external elements from entering the chamber.

In a further alternative embodiment, the storage compartment and/or enclosure is eliminated for users who have strict spatial constraints. In this embodiment, the base of the device is located in a closer proximity to the ash pan having a smaller clearance area located there between. The base may be configured with a thicker base height to act as a deck and prevent thermal heat transfer from the device to a flooring surface or ground.

BRIEF DESCRIPTION OF THE SEVERAL VIEWS OF THE DRAWINGS

The invention will now be described in greater detail in the following way of example only and with references to the attached drawings, in which:

FIG. 3 is a right hand side view of the grill, smoker and fireplace device.

FIG. 4 is a left hand side view of the grill, smoker and fireplace device.

DETAILED DESCRIPTION OF THE INVENTION

Figure 1:
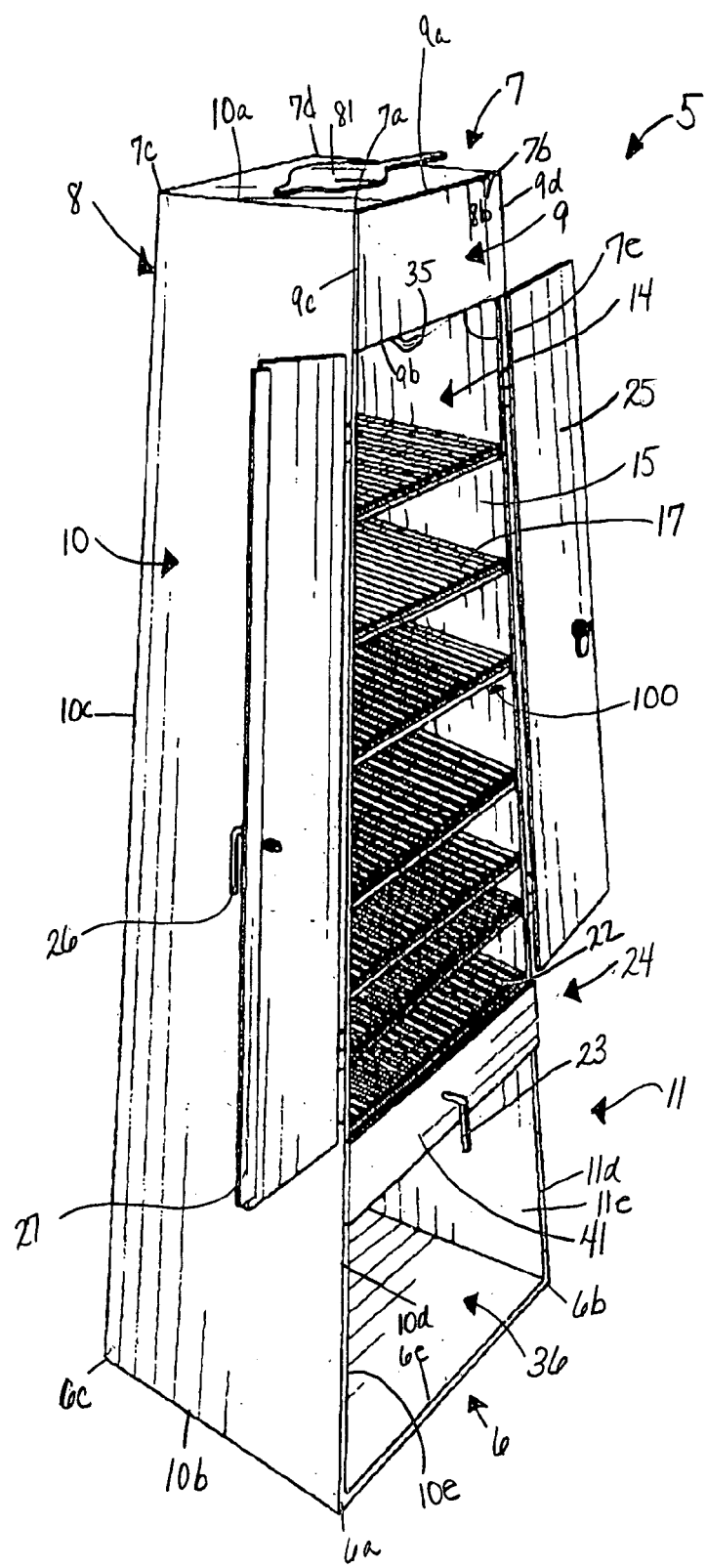
FIG. 1 is a perspective view of a vertical grill, smoker and fireplace device.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

FIGS. 1–7 show a combination grill, smoker and fireplace 5 having a combustion and cooking enclosure with multiple flat planar peripheral surfaces comprising a flat horizontal base 6 having horizontal side edges 6a, 6b, 6c and 6d. The base 6 supports the combination grill, smoker and fireplace 5 on a ground surface. A vertical, inwardly inclined rear wall 8, a vertical, inwardly inclined front wall 9 and vertical, inwardly inclined side walls 10 and 11 extend upwardly from the horizontal side edges 6a, 6b, 6c and 6d of the flat horizontal base 6. The combination grill, smoker and fireplace 5 is preferably made of steel, copper material or other heat resistant materials.

The vertical, inwardly inclined rear wall 8, the vertical, inwardly inclined front wall 9 and the vertical, inwardly inclined side walls 10 and 11 each have upper edges 8a, 9a, 10a and 11a, bottom edges 8b, 9b, 10b and 11b, side edges 8c, 8d, 9c, 9d, 10c, 10d, 11c and 11d and interior surfaces 8e, 9e, 10e and 11e. The base 6 and the cover 7 each have multiple edges 6a, 6b, 6c and 6d and 7a, 7b, 7c and 7d, respectfully, and interior surfaces 6e and 7e, respectfully. The vertical, inwardly inclined rear wall 8 and the vertical, inwardly inclined front wall 9 are attached to and extend upwardly from the base 6 and are inclined inwardly; and the side walls 10 and 11 extend upwardly from the edges 6a, 6b, 6c and 6d of base 6 and are inclined inwardly. The vertical side edges 10c, 10d, 11c and 1d of the side walls 10 and 11 are connected to the side edges 8c and 8d of the rear wall 8 and the side edges 9c and 9d of the front wall 9 to form a chamber 14 therein. The upper edges 8a, 9a, 10a and 11a of the vertical, inwardly inclined rear wall 8, vertical, inwardly inclined front wall 9 and vertical, inwardly inclined side walls 10 and 11 are attached to the side edges 7a, 7b, 7c and 7d of the flat horizontal cover 7 at the top of the combination grill, smoker and fireplace 5.

The edges 6a, 6c and 6b, 6d of the base 6 are attached to each of the bottom edges 10b and 11b of the side walls 10 and 11 and edges 6c, 6d of the base 6 are connected to the bottom edge 8b of the rear wall 8. Each side edge 7a, 7b, 7c and 7d of the top flat cover 7 is joined to each of the upper edges 8a, 9a, 10a and 11a of the rear wall 8, the front wall 9 and the side walls 10 and 11. The bottom edges 10b and 11b of the side walls 10 and 11 and the bottom edge 8b of the rear wall 8 are attached to the edges 6a, 6b, 6c and 6d of the base 6 at bigger angles, whereas the upper edges 8a, 9a, 10a and 11a of the rear wall 8, the front wall 9 and the side walls are coupled to the cover 7 at smaller angles. This deviation in the angles where the rear wall 8, front wall 9 and the side walls 10 and 11 connect to the base 6 versus the where the rear wall 8, the front wall 9 and the side walls 10 and 11 are joined to the top surface 7 allow for the combination grill, smoker and fireplace 5 to taper in an upward fashion.

Once the rear wall 8, the front wall 9 and the side walls 10 and 11 are connected to each other and to the base 6 and the cover 7, the chamber 14 is formed therein. Walls 15 of the chamber 14 are formed from the interior surfaces 10e, 11e, 8e and 9e of the side walls 10 and 11, the rear wall 8 and the front wall 9. The walls 15 of the chamber 14 have a rack support means 100 such as sets of lateral shelf members perpendicularly extending from at least two opposing walls 15. Each set of lateral shelf members supports one or more racks 17. Alternatively, the rack support means 100 may be heat resistant guide rails attached to the interior surfaces 10e and 11e of the side walls 10 and 11 and provide horizontal slidable engagement of the racks 17. In the most preferred embodiment, multiple racks 17 are inserted into the chamber 14 of the combination grill, smoker and fireplace 5, where the number of racks 17 is only limited to the height of the chamber 14.

A portion of the front wall 9 incorporates a door 25, preferably a set of doors, where each door 25 is fastened to a side end 10d and 11d of the side walls 10 and 11. Each door 25 has a handle 26 allowing a user to move the door from an open configuration to a closed configuration. FIGS. 1, 3 and 5–7 show a protruding edge 27 extending from the door 25 to either contact a mating door, or alternatively, contact the front wall 9 or the side walls 10 and 11 to provide a seal, protect any items stored inside the chamber 14 and prevent external elements such as insects or rain from entering into the chamber 14.

A fire grate 22 is disposed within the chamber 14 to support burnable material thereon such as charcoal, wood chips, paper and the like. The grate 22 may be supported by a grate support means such as a set of lateral shelf members or heat resistant guide rails. Alternatively, the fire grate 22 may have legs orthogonally extending from the fire grate 22 in a downward manner. The fire grate 22 is preferably interiorly positioned below the racks 17 and above a heat source 20 to allow for the heat source 20 to contact the burnable material and generate heat allowing the heat to rise and penetrate items such as food placed on the racks 17. In an alternative embodiment, the heat source 20 may be positioned on and extend from the walls 15 of the chamber 14 including but not limited to an electrical heating elements or gas jets.

As the heat rises from the heat source and/or the burning material, the interior surfaces of the chamber 14 define a uniformly shaped passageway upwardly extending from the heat source and leading to the cover 7. Specifically, the interior surfaces 8e, 9e, 10e and 11e of the chamber 14 are tapered in an upward, vertical configuration to reflect the heat at an optimal angle and reduce inefficient radial bounce. The uniformly tapered interior surfaces 8e, 9e, 10e and 11e of the chamber 14 control the flow of heat through the chamber 14 to exit out of the cover 7 without creating a thermal bottleneck or flare-ups, and thereby reducing the occurrence of the heat crowning near the cover 7.

The cover 7 collectively includes a cap 81, a throw handle 35 and a vent system 28. The vent system 28 incorporates a damper 30 and a spark arrester screen 33. The throw handle 35 is engaged to the vent system 28 to adjust the vent system 28, specifically the damper 30, from a closed position to an open position. When the damper 30 is in a completely open configuration, the heat, gases and smoke generated from within the chamber 14 flows upwardly through the chamber 14 and escape from within the chamber 14 and exit through the vent system 28 and outside the cap 81. When the damper 30 is completely closed, no smoke, heat or gases are emitted from the vent system 28, thereby allowing thermal pressure to build up within the chamber 14.

The damper 30 is positioned beneath the spark arrester screen 33 in order to humidify active sparks, thereby diminishing the spark. The spark arrestor screen 33 is disposed over the damper 30 to prevent stray sparks from exiting the cap 81 and setting external surrounding objects on fire. The spark arrestor screen 33 may also prevent outside elements from entering the chamber 14 when the device 5 is either in active use or idle.

Figure 6:
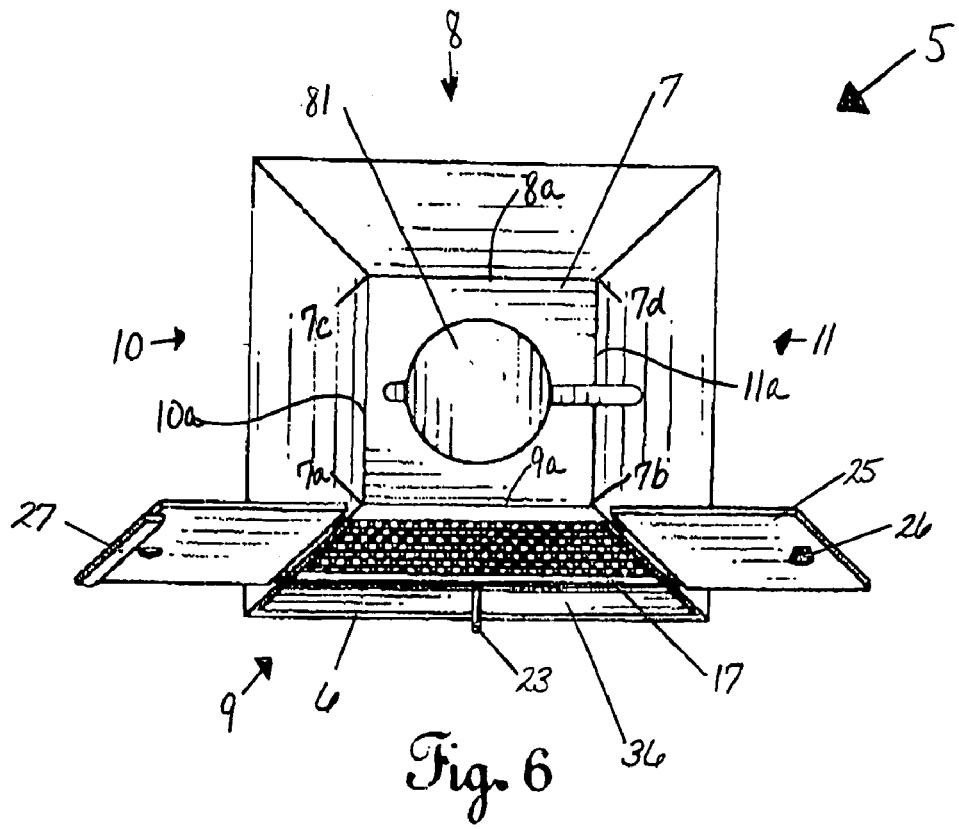
FIG. 6 is a top view of the grill, smoker and fireplace device.
Figure 7:
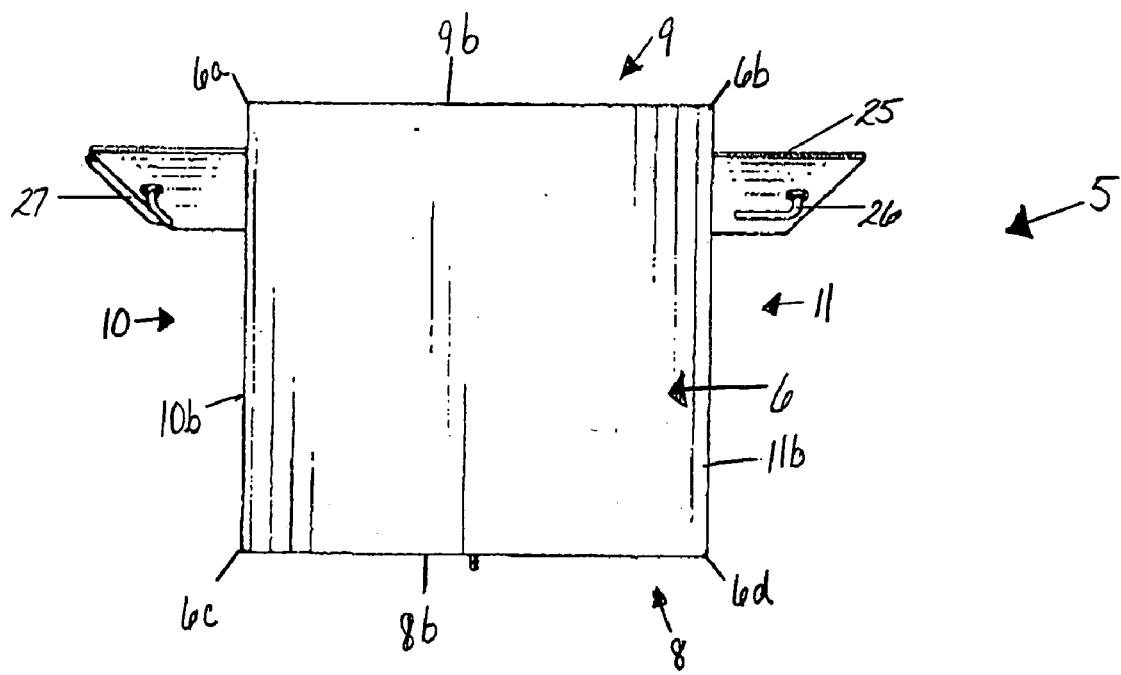
FIG. 7 is a bottom view of the grill, smoker and fireplace device.

FIG. 6 shows the top view of the device 5 having the tapered configuration. Specifically, the rear wall 8, the front wall 9 and the side walls 10 and 11 each depict an identical trapezoidal shape having edges 8c, 8d, 9c, 9d, 10c, 10d, 11c and 11d adjacently positioned and fastened to each other to form the chamber 14 which tapers inward from end to end. The edges 7a, 7b, 7c and 7d of the cover 7 are fastened, preferably welded, to the edges 8a, 9a, 10a and 11a of the trapezoidal-shaped rear wall 8, front wall 9 and side walls 10 and 11.

A removable ash and combustion pan 24 is positioned below the chamber 14, preferably beneath the fire grate 22 and the heat source 20 in order to catch fallen ashes or other remnants from the heat source and/or burnable material. The ash pan 24 collectively comprises a lateral shelf perpendicularly coupled to a drawer face 41. The drawer face 41 has a handle 23 attached thereon to allow a user to open the ash pan 24 when excess ashes need to be disposed and to close the ash pan 24 when the disposing process has been completed. Side walls may orthogonally extend from opposing sides of the lateral shelf and join each end of the drawer face at 90° angles.

Figure 2:
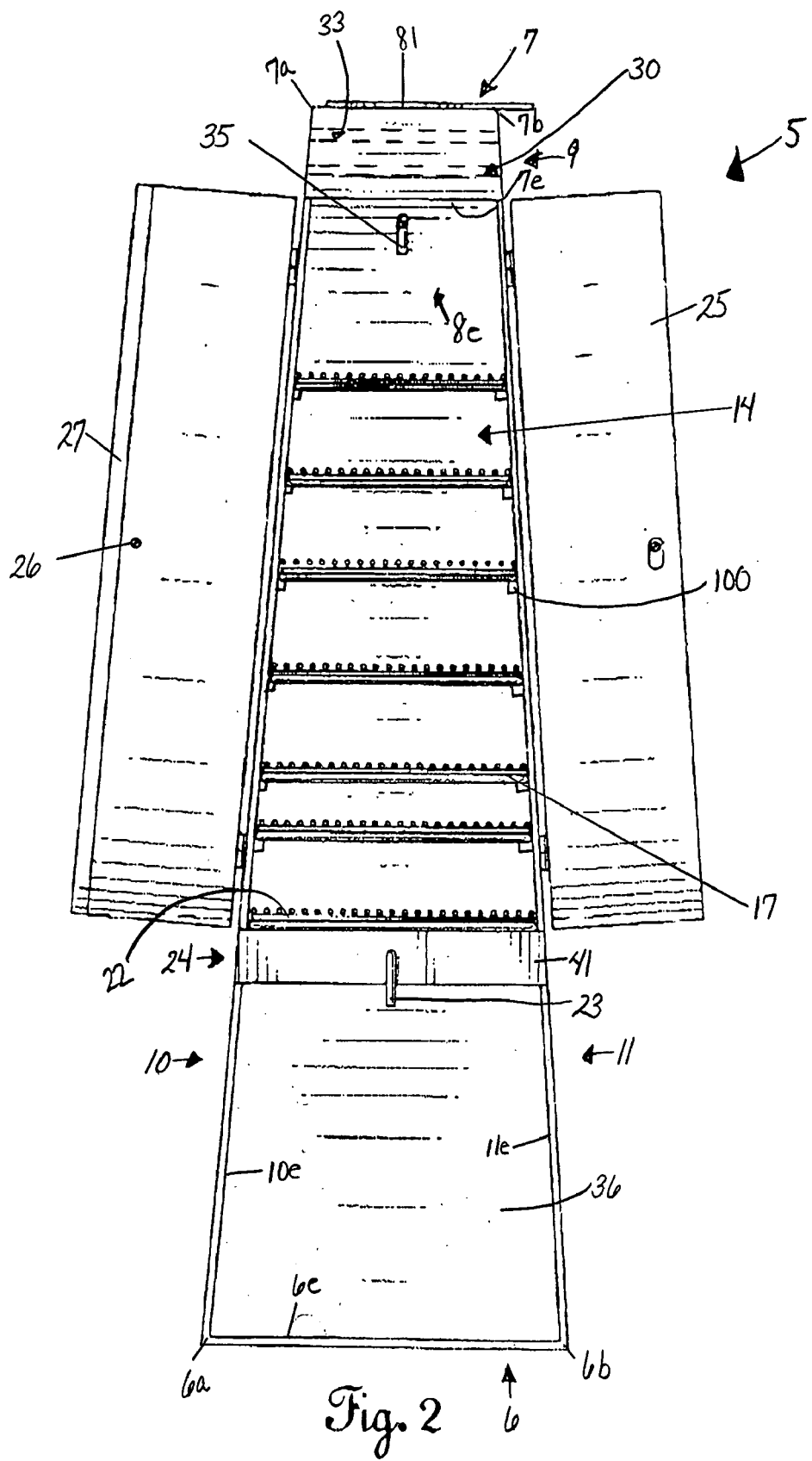
FIG. 2 is a front view of the vertical grill, smoker and fireplace device.
Figure 5:
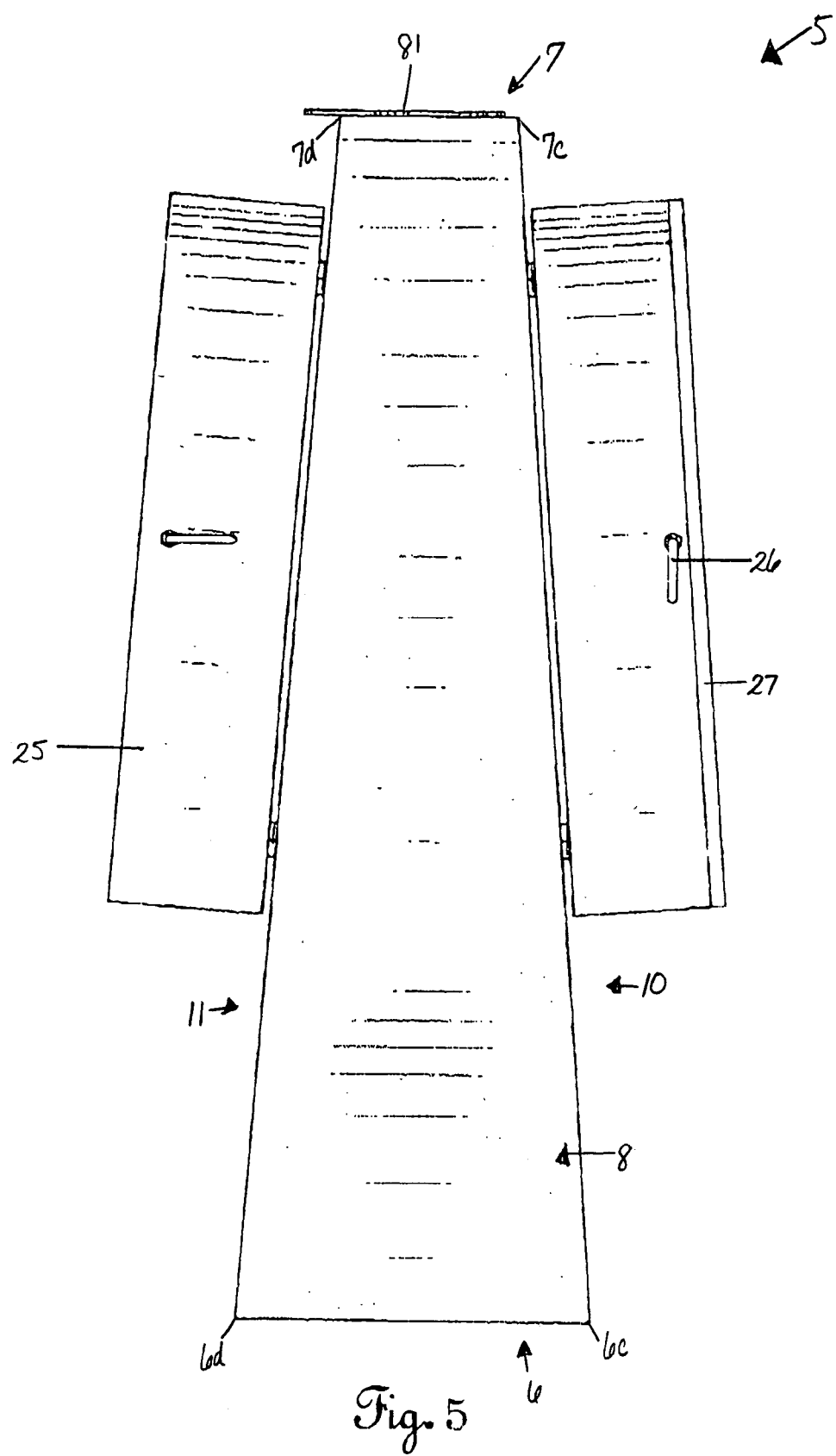
FIG. 5 is a rear view of the grill, smoker and fireplace device.

FIGS. 1 and 2 show a storage compartment 36 being positioned underneath the ash pan 24. The storage compartment 36 allows for a user to store equipment such as heat resistant cooking equipment (i.e. oven pans), fireplace accessories or extra burning materials such as coal and wood chips. The storage compartment 36 is made of the interior surface 6e of the base 6 and a portion of the interior surfaces 10e and 11e of the side walls 10 and 11 and a portion of the interior surface 8e of the rear wall 8. The storage compartment 36 may be an open space or may house at least one drawer.

Figure 8:
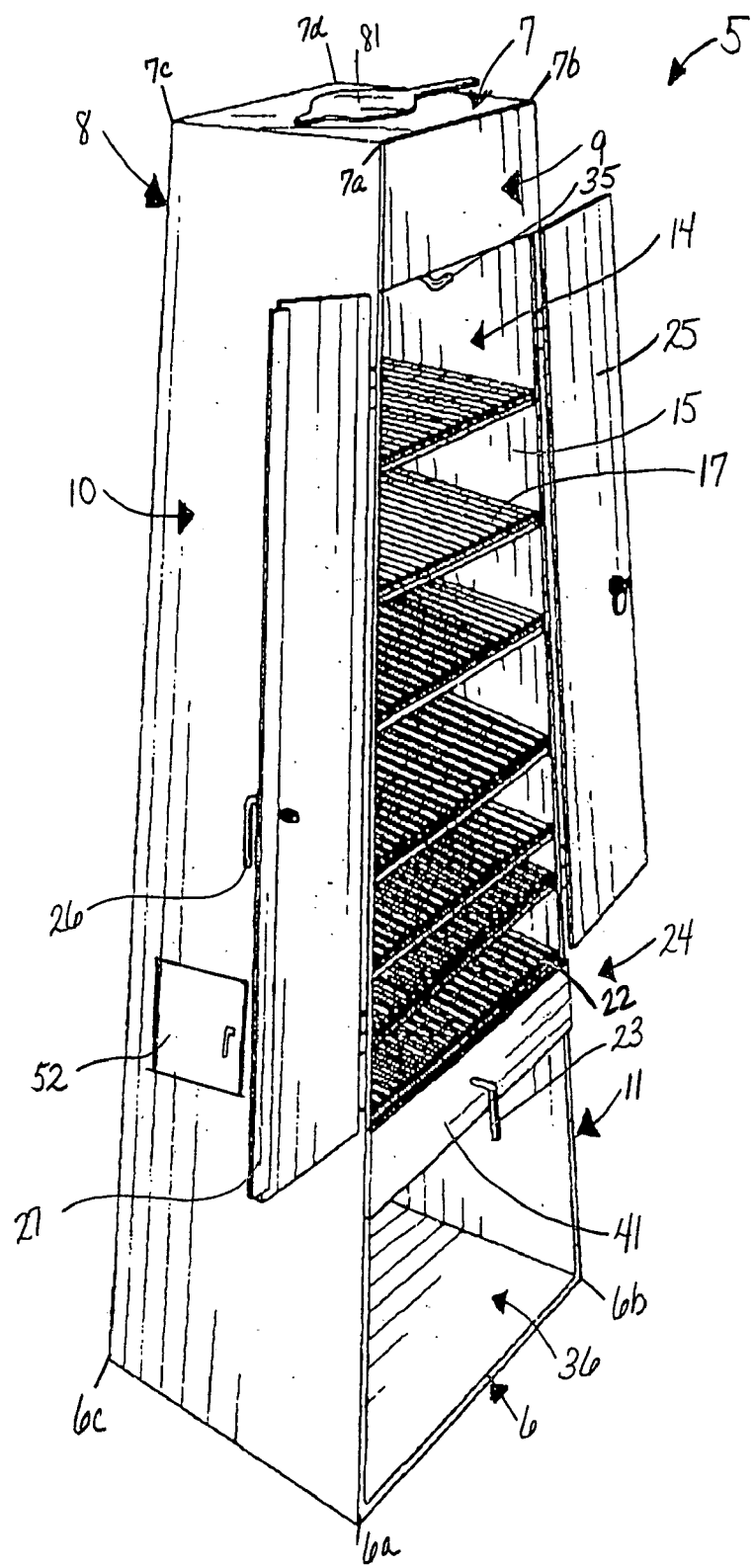
FIG. 8 is a further alternative embodiment showing a side opening bored within a surface of the grill, smoker and fireplace device.

FIG. 8 shows an opening 52 bored through one of the side walls 10 and 11 or the rear wall 8 allowing the user to insert burnable material through the opening 52 and onto the fire grate 22. The opening 52 may include a door to provide the user easy access to the grate 22 and allow the fire grate 22 within the chamber 14 to be hidden when the combination grill, smoker and fireplace 5 is not being utilized.

FIGS. 9–15 illustrate an alternative embodiment where the combination grill, smoker and fireplace 5 incorporates at least one door, preferably a second set of doors 40, fastened near the bottom edges 10b and 11b of the side walls 10 and 11 forming an enclosure 60 therein. The enclosure 60 is collectively made of the second set of doors 40, the interior surface 6e of the base 6, a portion of the interior surfaces 10e and 11e of the side walls 10 and 11 and a portion of the interior surface 8e of the rear wall 8. Each door 40 has a handle 56 allowing the user to move the door 40 from an open configuration to a closed configuration. FIGS. 9–11 and 13–15 show a protruding edge 57 extending from the door 40 to either contact another door, or alternatively, the side walls 10 and 11 to provide a seal, protect any items stored inside the chamber 14 and prevent external elements such as insects or rain from entering into the chamber 14.

Figure 9:
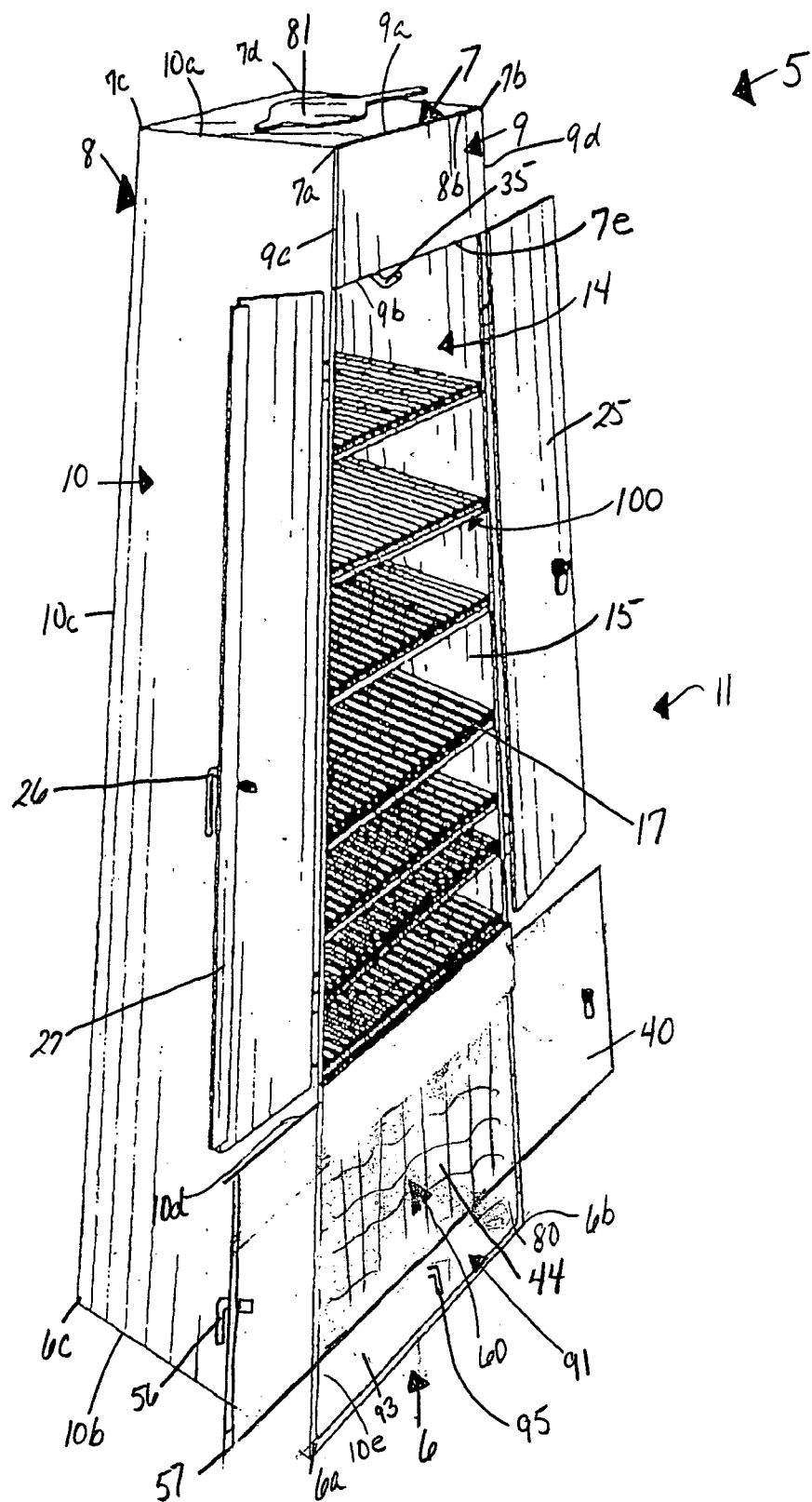
FIG. 9 is a perspective view of an alternative embodiment of the vertical grill, smoker and fireplace device having a second set of doors located below a first set of doors.
Figure 10:
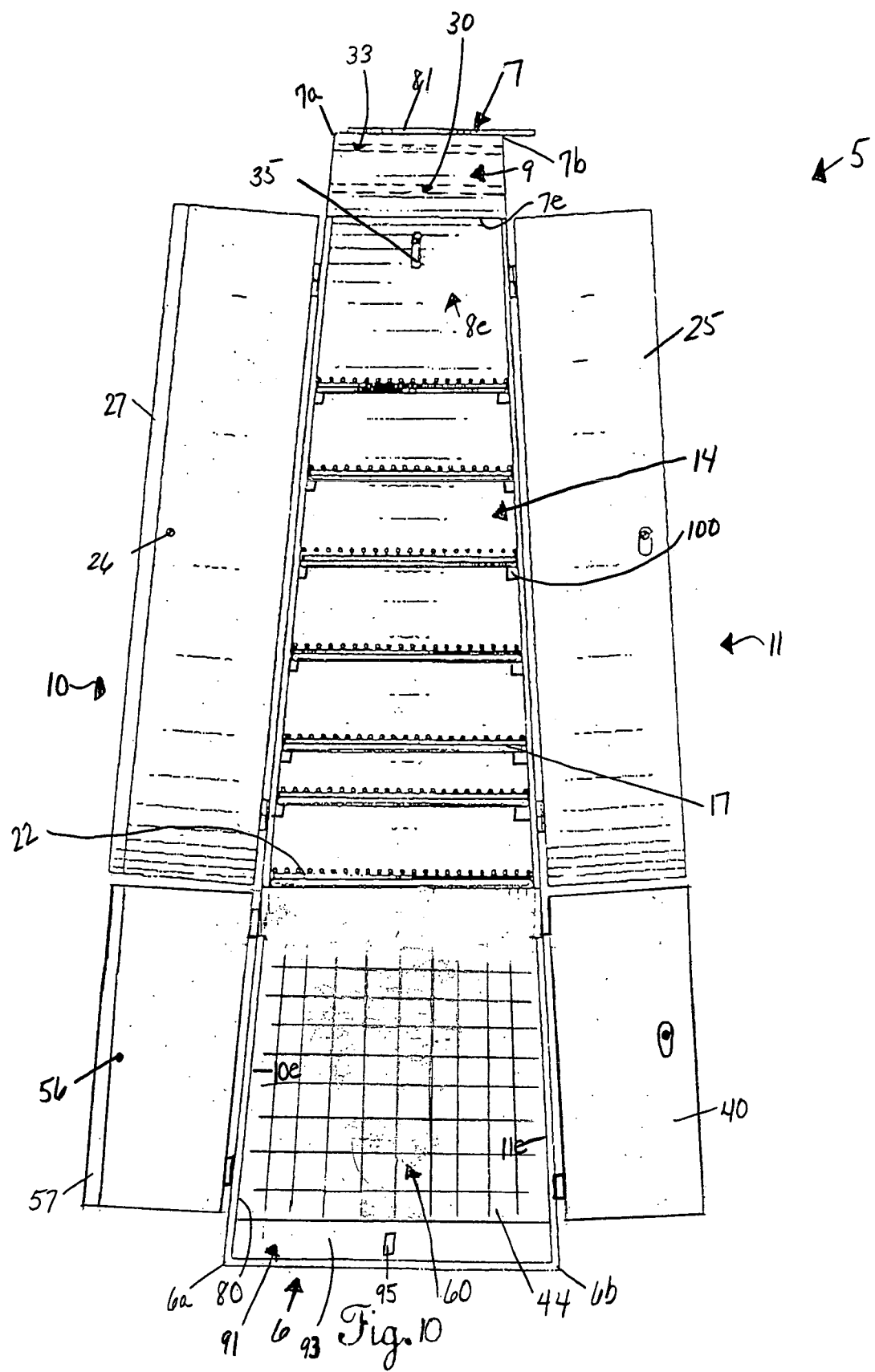
FIG. 10 is a front view of the alternative embodiment.
Figure 11:
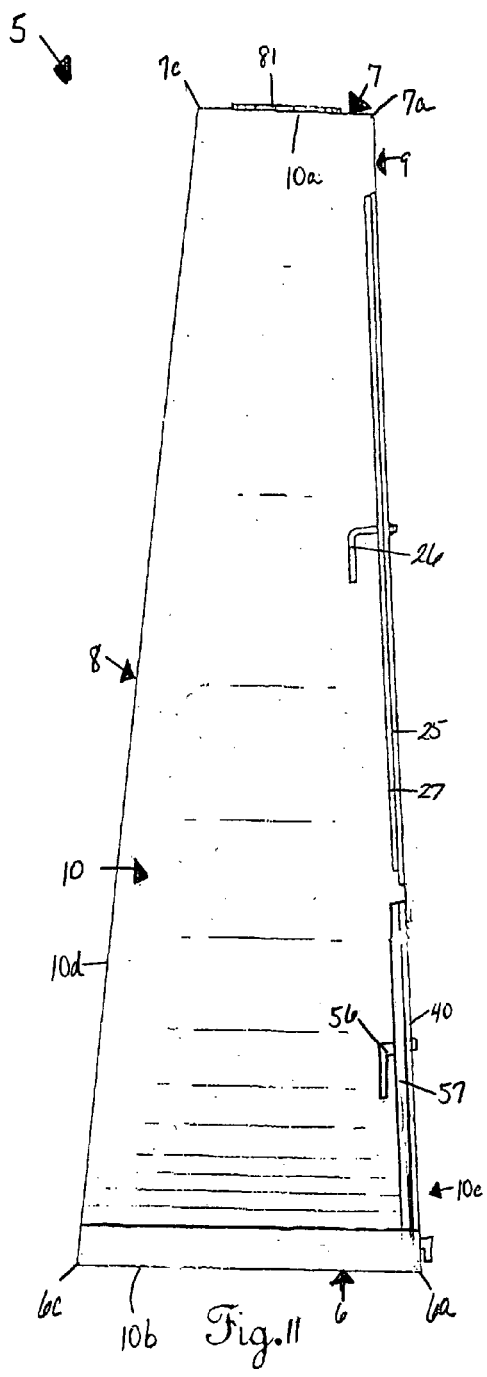
FIG. 11 is a right hand side view of the alternative embodiment.
Figure 12:
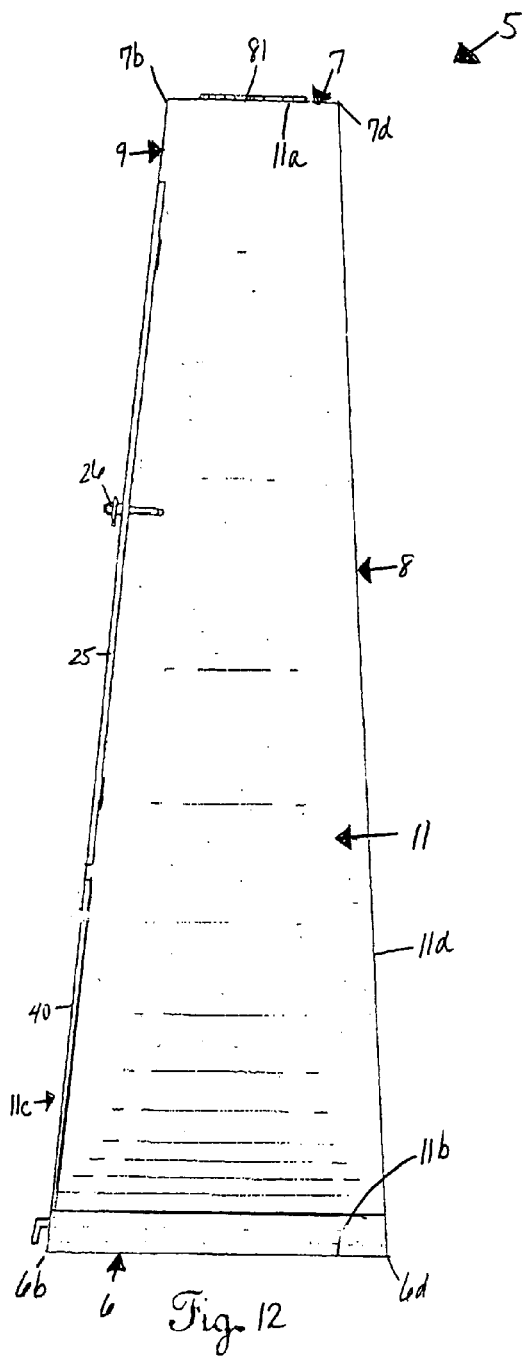
FIG. 12 is a left hand side view of the alternative embodiment.
Figure 13:
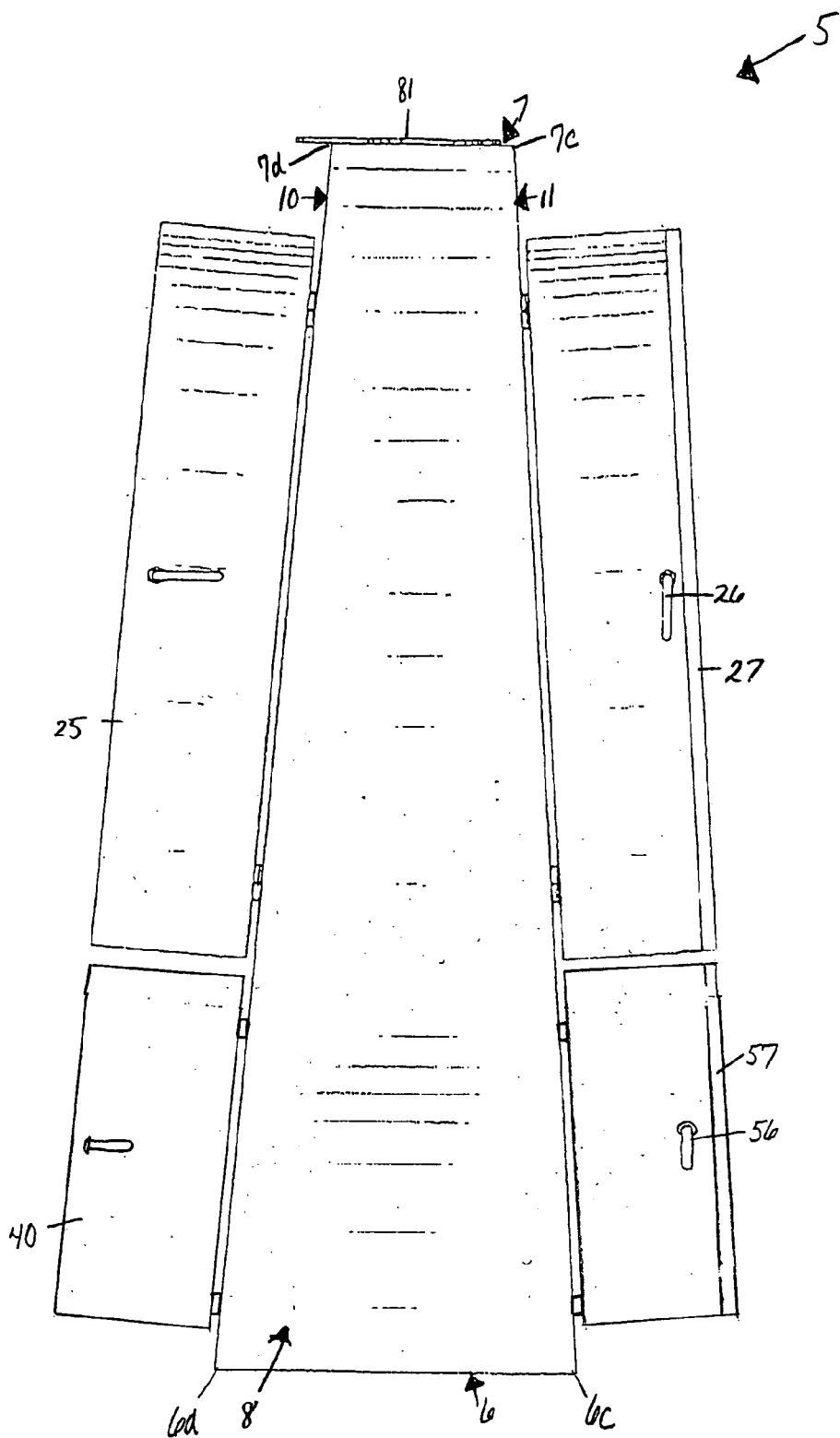
FIG. 13 is a rear view of the alternative embodiment.
Figure 14:
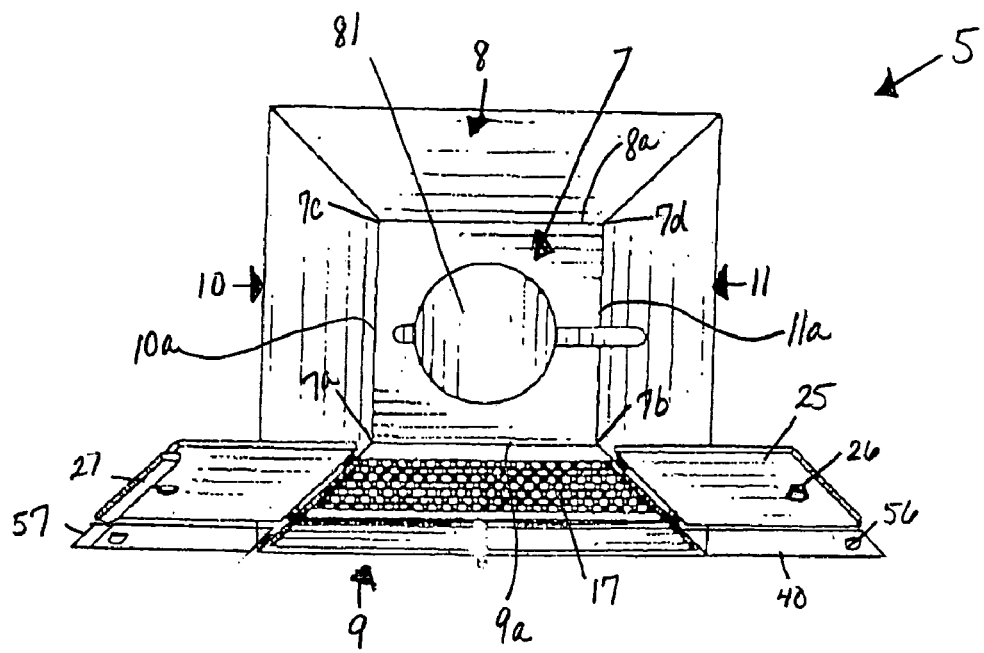
FIG. 14 shows an elevated view of the alternative embodiment.
Figure 15:
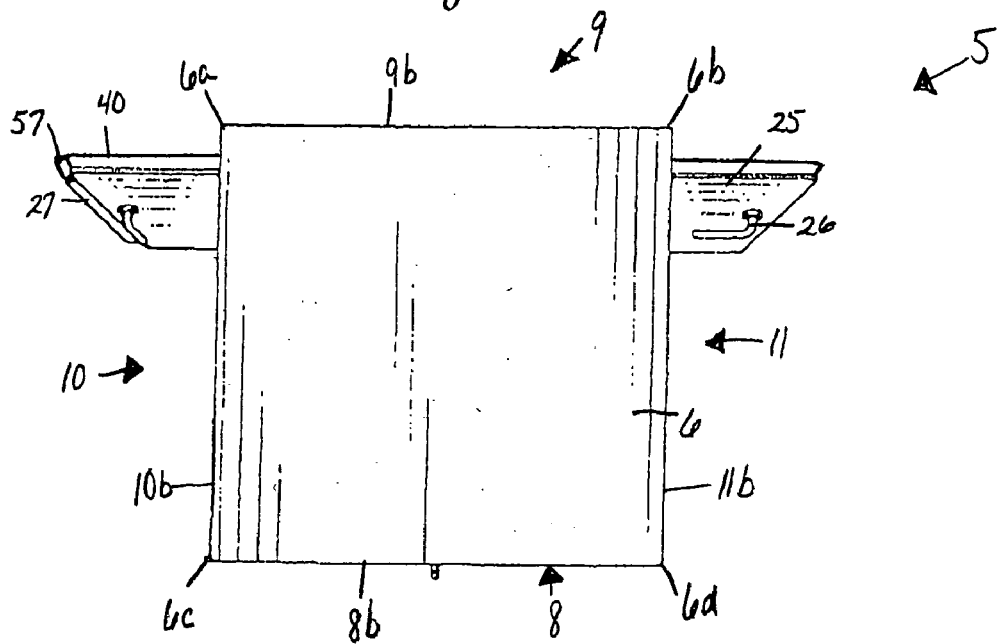
FIG. 15 is a bottom view of the alternative embodiment.
Figure 16:
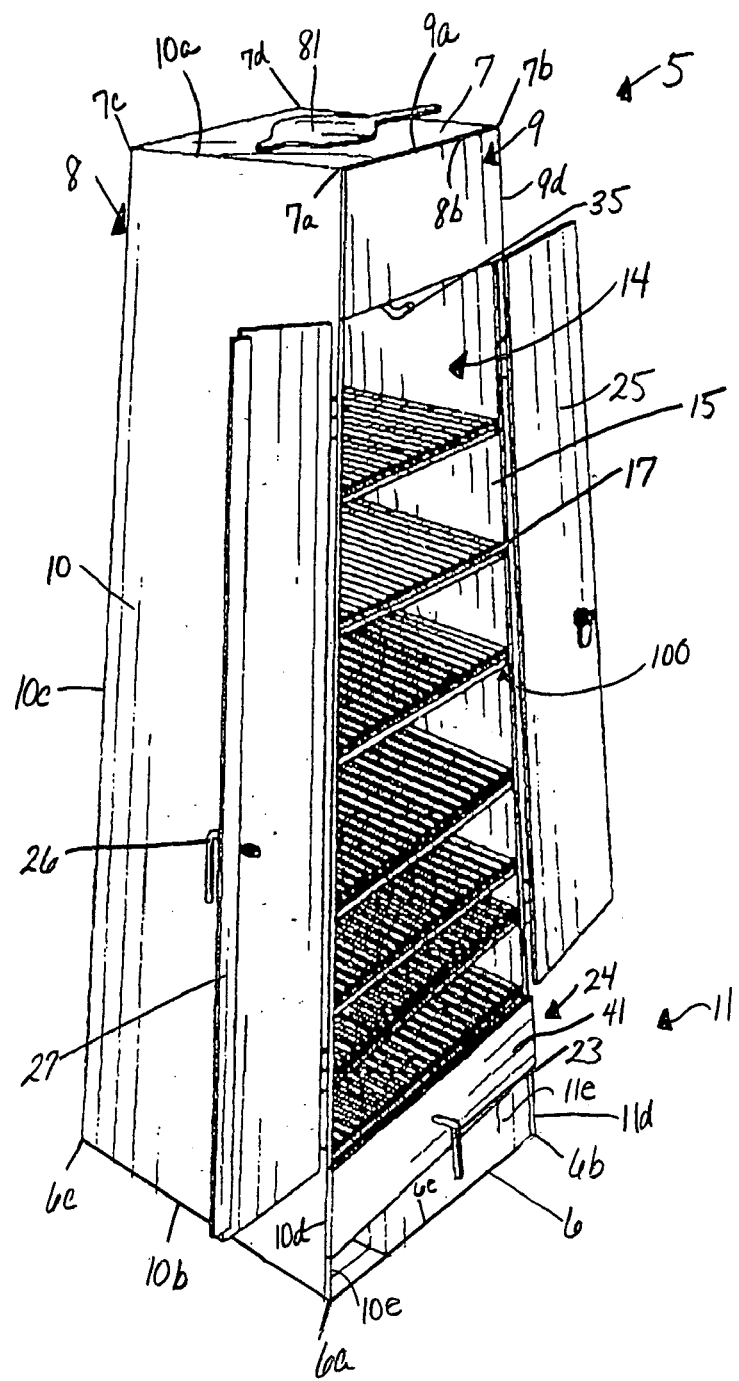
FIG. 16 is a perspective view of a second alternative embodiment of the vertical grill, smoker and fireplace device.
Figure 17:
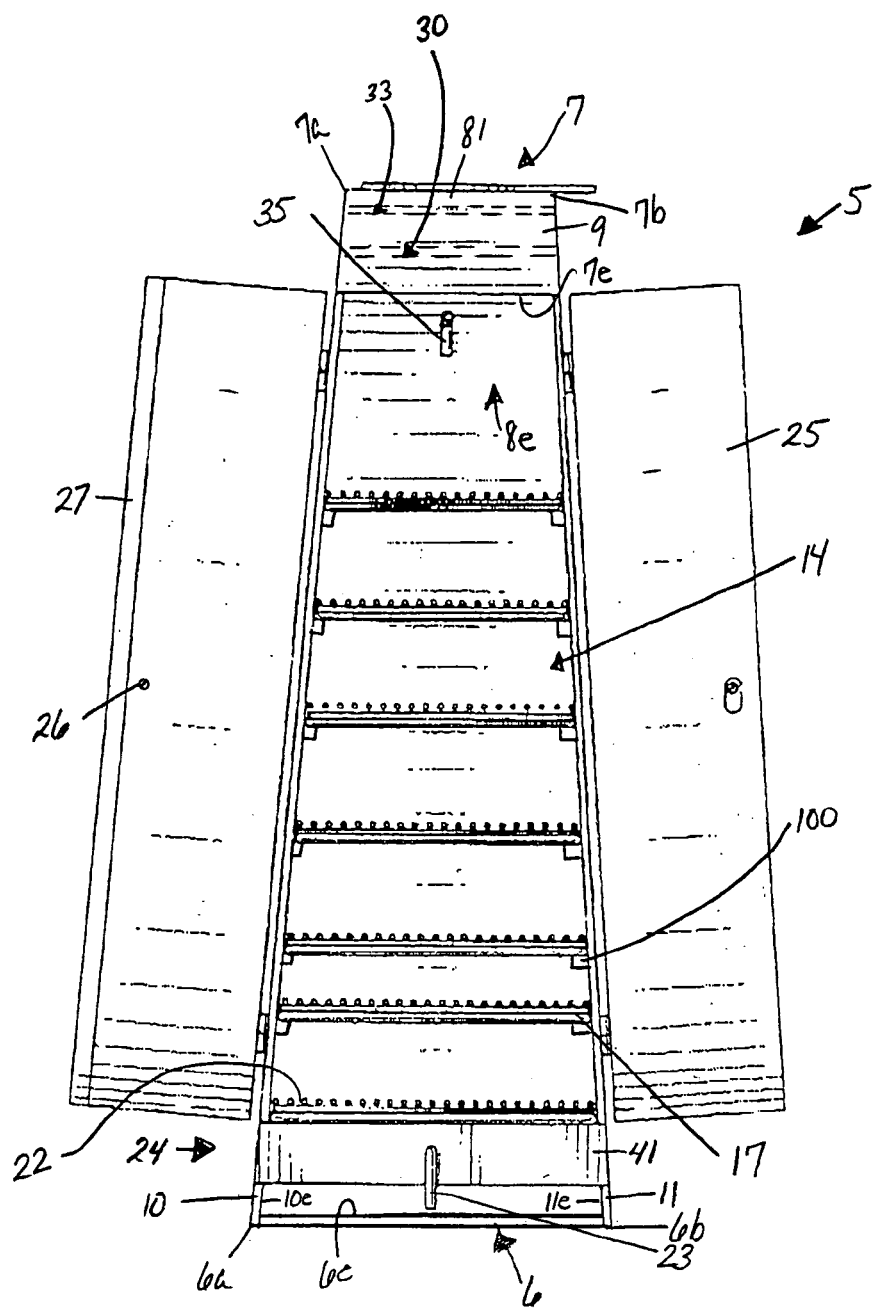
FIG. 17 is a front view of the second alternative embodiment.
Figures 18, 19:
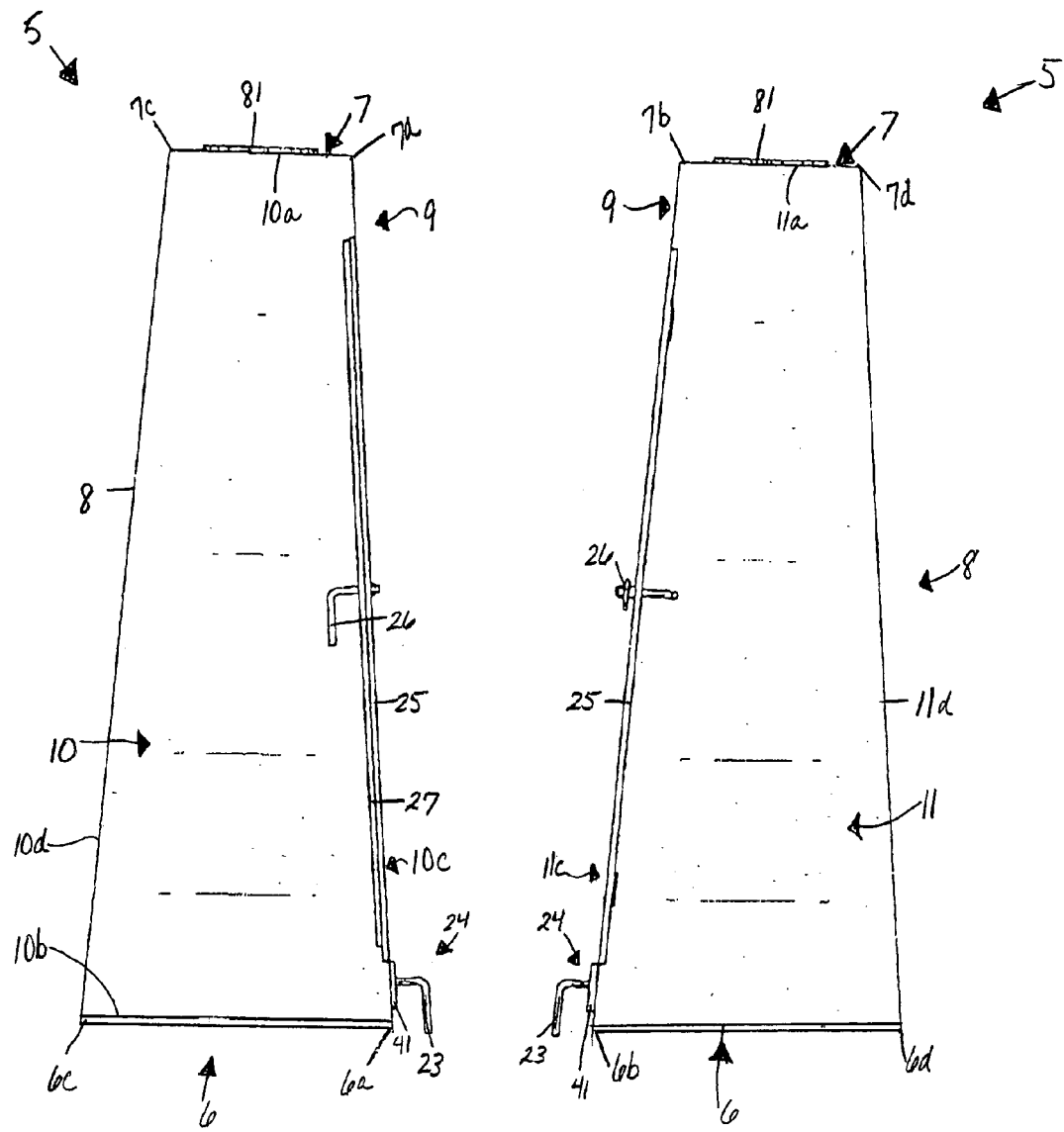
FIG. 18 is a right hand side view of the second alternative embodiment.
FIG. 19 is a left hand side view of the second alternative embodiment.
Figure 20:
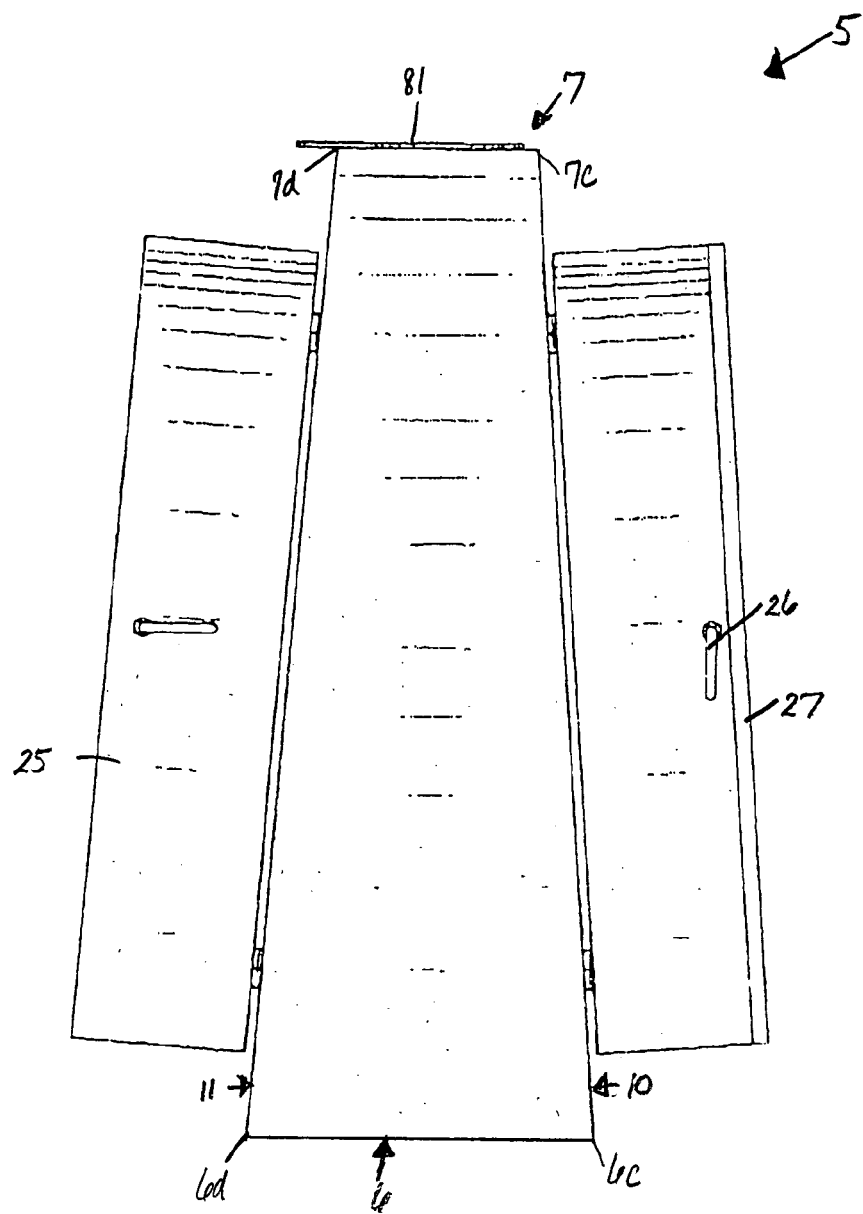
FIG. 20 is a rear view of the second alternative embodiment.
Figure 21:
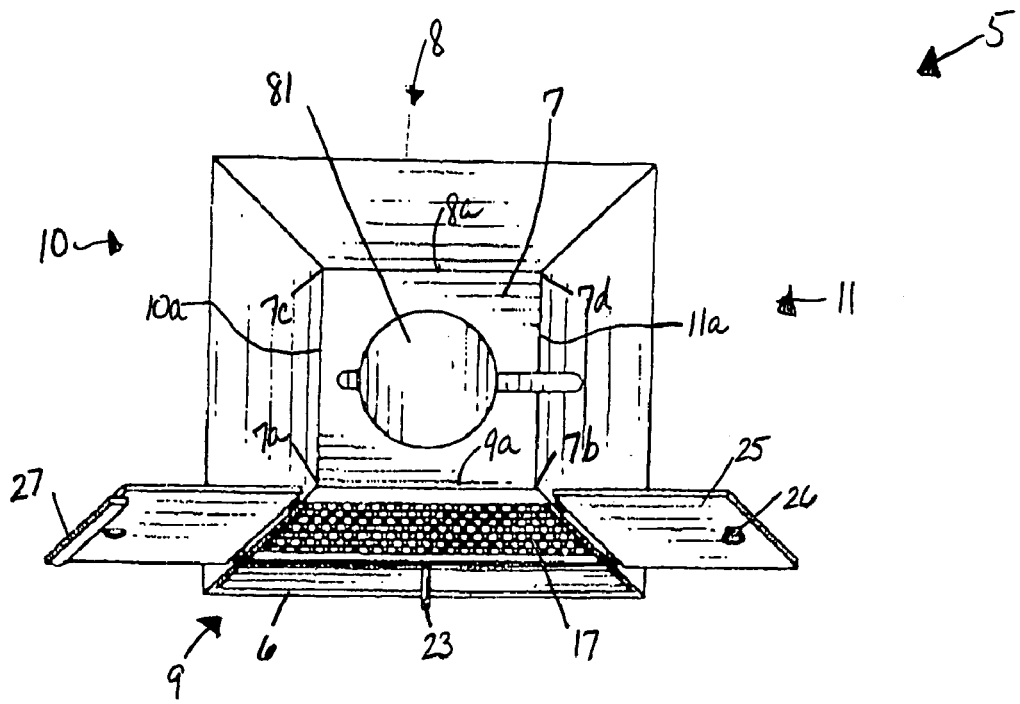
FIG. 21 is a top view of the second alternative embodiment.
Figure 22:
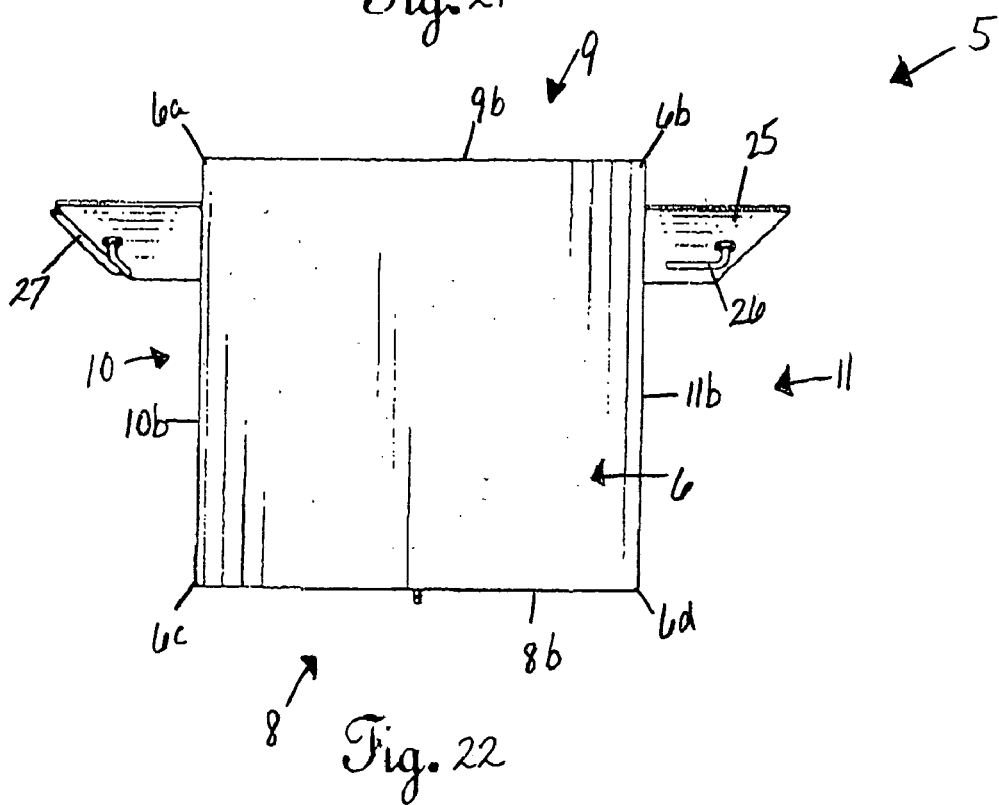
FIG. 22 is a bottom view of the second alternative embodiment.

In FIGS. 9 and 10, the enclosure 60 may function like a fireplace, whereby the enclosure 60 houses a heat source and burnable material therein. A removable ash and combustion pan 91 is positioned below the heat source and burnable material to collect ashes therein. The heat generated from the heat source and the burnable material rises and enters into the chamber 14 allowing the user to enjoy the fire in the enclosure 60, while the chamber 14 acts as a chimney.

Screen doors 44 are positioned behind the second set of doors 40 to allow the user to enjoy the fire without being harmed by heated substances. Preferably, the screen doors 44 are independently fastened to the enclosure 60 and not the second set of doors 40, thereby preventing escaping sparks from coming into physical contact with the user.

The enclosure 60 may also function as a smoker or grill, whereby the enclosure 60 houses the heat source and may include a fire grate positioned above the heat source. Walls 80 of the enclosure 60 may include a rack support means 100 such as sets of lateral shelf members perpendicularly extending from at least two opposing walls 80. Each set of lateral shelf members supports a rack 77. In the most preferred embodiment, multiple racks 77 are inserted into the enclosure 60, where the number of racks 77 is only limited to the height of the enclosure 60. Other rack support means 100 may include, but is not limited to, heat resistant guide rails attached on the walls 80.

Specifically, the ash pan 91 is positioned near the base 6 of the combination grill, smoker and fireplace 5 to collect fallen ashes or remnants from burnable material therein. The ash pan 91 may collectively comprise of a lateral shelf perpendicularly coupled to a drawer face 93. The drawer face 93 has a handle 95 attached thereon to allow a user to open the ash pan 91 when excess ashes need to be disposed and to close the ash pan 91 when the disposing process has been completed. Side walls may orthogonally extend from opposing sides of the lateral shelf and join each end of the drawer face at 90° angles.

In a further alternative embodiment, shown in FIGS. 16–22, the base 6 of the device 5 is located in a closer proximity to the ash pan 24 having a clearance area there between. Preferably the clearance area is 6"–10" between the base 6 and the ash pan 24. The base 6 may be configured with a thicker base height to act as a deck and prevent thermal heat transfer from the combination grill, smoker and fireplace 5 to a flooring surface or ground.

While the above detailed description describes a preferred embodiment and best mode of the invention, it should be understood and apparent to those skilled in the art that various other embodiments of the invention can be created without departing from the spirit and scope of the invention, which is defined in the claims that follow.

What is claimed and desired to be secured by Letters Patent is as follows:

1. A combination grill, smoker and fireplace comprising:
   a combustion and cooking enclosure having a base, a cover, an inwardly inclined rear wall, an inwardly inclined front wall and inwardly inclined side walls wherein rising heat is reflected at an angle from within said inwardly inclined chamber, thereby reducing radial bounce;
   a set of doors incorporated into said front wall allowing access into said chamber;
   a rack support means secured to said walls to support a plurality of vertically spaced racks thereon;
   a fire grate disposed below said racks and for supporting burnable material supported on said grate, wherein heat generated from said burnable material rises in said chamber upwardly extending from said heat source to said cover;
   a removable ash and combustion pan positioned below said chamber to catch fallen ashes generated from said burnable material; and
   said cover having a vent means to allow a controlled amount of heat to pass through and exit said cover.

2. The combination grill, smoker and fireplace device as recited in claim 1, wherein said rear wall, said front wall and said side walls each having a trapezoidal shape.

3. The combination grill, smoker and fireplace device as recited in claim 1, further comprising a storage compartment positioned formed from an interior surface of said base, a portion of interior surfaces of said side walls and a portion of interior surfaces of said rear wall, wherein said storage compartment is positioned underneath said ash pan.

4. The combination grill, smoker and fireplace device as recited in claim 1, wherein said fire grate has legs orthogonally extending in a downward manner.

5. The combination grill, smoker and fireplace device as recited in claim 1, wherein said fire grate is supported by a grate support means.

6. The combination grill, smoker and fireplace device as recited in claim 1, wherein said rack support means is guide rails attached to said walls of said chamber to sliding in and out of said racks.

7. The combination grill, smoker and fireplace device as recited in claim 1, wherein said heat source includes an electric heater.

8. The combination grill, smoker and fireplace device as recited in claim 1, wherein the ash pan is spaced above the base to provide a lower storage compartment at the bottom of the enclosure.

9. The combination grill, smoker and fireplace device as recited in claim 1, further comprising a door in at least one of said side walls allowing combustible material to be inserted through said door and onto the grate.

10. The combination grill, smoker and fireplace device as recited in claim 1, wherein said vent means comprising a damper and a spark arrester screen, wherein said damper is disposed beneath said spark arrester screen to extinguish sparks and said spark arrester screen catches said sparks from exiting said cap.

11. The combination grill, smoker and fireplace device as recited in claim 1, wherein said set of doors having a protruding edge on one door extending from at least one of said doors to act as a seal.

12. The combination grill, smoker and fireplace device as recited in claim 1, further comprising a second set of doors positioned underneath said first set of doors and forming a lower front wall allowing entry and access to the enclosure.

13. The combination grill, smoker and fireplace device as recited in claim 12, wherein said second set of doors having a protruding edge on one door extending from at least one of said doors to act as a seal.

14. The combination grill, smoker and fireplace device as recited in claim 12, further comprising screen doors positioned behind said second set of doors.

15. The combination grill, smoker and fireplace device as recited in claim 8, wherein the ash pan is positioned at the bottom of said enclosure and said second set of doors to catch fallen ashes and provide a fireplace effect when the lower doors are open and the upper doors are closed.

* * * * *